(12) United States Patent
Roberts et al.

(10) Patent No.: US 9,908,195 B2
(45) Date of Patent: Mar. 6, 2018

(54) PLASMA CUTTING SYSTEM WITH EFFICIENT COMPONENTS

(71) Applicant: Hypertherm, Inc., Hanover, NH (US)

(72) Inventors: Jesse A. Roberts, Cornish, NH (US); Shreyansh Patel, Lebanon, NH (US); Stephen T. Eickhoff, Hanover, NH (US); Justin Gullotta, Brownsville, VT (US); Qinghua Liu, Etna, NH (US); Dennis M. Borowy, Hanover, NH (US); Zheng Duan, Hanover, NH (US); Ashok V. Retnaswamy, Humble, TX (US); Sung Je Kim, Santa Clara, CA (US)

(73) Assignee: Hypertherm, Inc., Hanover, NH (US)

( * ) Notice: Subject to any disclaimer, the term of this patent is extended or adjusted under 35 U.S.C. 154(b) by 370 days.

(21) Appl. No.: 14/610,135

(22) Filed: Jan. 30, 2015

(65) Prior Publication Data

US 2015/0343554 A1 Dec. 3, 2015

Related U.S. Application Data

(60) Provisional application No. 62/005,526, filed on May 30, 2014.

(51) Int. Cl.
*B23K 10/00* (2006.01)
*H05H 1/34* (2006.01)
*H05H 1/28* (2006.01)

(52) U.S. Cl.
CPC .............. *B23K 10/00* (2013.01); *H05H 1/28* (2013.01); *H05H 1/34* (2013.01); *H05H 1/3405* (2013.01);
(Continued)

(58) Field of Classification Search
CPC .... H05H 1/28; H05H 1/34; H05H 2001/3468; H05H 2001/3478; H05H 2001/3489; H05H 2245/125; H05H 1/3405; B23K 10/00
(Continued)

(56) References Cited

U.S. PATENT DOCUMENTS 3,569,661 A * 3/1971 Ebeling, Jr. ............... H05H 1/32
219/121.36
3,684,911 A * 8/1972 Perugini ................... H05H 1/32
219/121.47
(Continued)

FOREIGN PATENT DOCUMENTS

WO 2008/101226 8/2008

OTHER PUBLICATIONS

Powermax190c®, Portable Plasma Cutting System with Air Compressor, Apr. 2005, 2 pages.
(Continued)

*Primary Examiner* — David Angwin
*Assistant Examiner* — Frederick Calvetti
(74) *Attorney, Agent, or Firm* — Proskauer Rose LLP

(57) ABSTRACT

A plasma cutting system is provided. The system includes a power source configured to generate a plasma arc, and a plasma arc torch connected to the power source for delivering the plasma arc to a workpiece. The plasma arc torch defines a multi-function fluid flow path for sustaining the plasma arc and cooling the plasma arc torch such that the plasma cutting system has a power-to-gas flow ratio of at least 2 kilowatts per cubic feet per minute (KW/cfm). The power-to-gas flow ratio comprises a ratio of power of the generated plasma arc to a total gas flow supplied to the plasma arc torch.

22 Claims, 6 Drawing Sheets

(52) U.S. Cl.
CPC ............... *H05H 2001/3468* (2013.01); *H05H 2001/3478* (2013.01); *H05H 2001/3489* (2013.01); *H05H 2245/125* (2013.01)

(58) Field of Classification Search
USPC ............ 219/121.39, 121.54, 121.45, 121.57, 219/121.55
See application file for complete search history.

(56) References Cited

U.S. PATENT DOCUMENTS

| | | | | |
|---|---|---|---|---|
| 4,570,048 | A * | 2/1986 | Poole | H05H 1/3405 219/121.5 |
| 4,902,871 | A * | 2/1990 | Sanders | B23K 9/0671 219/121.49 |
| 5,120,930 | A * | 6/1992 | Sanders | B23K 10/00 219/121.48 |
| 5,208,441 | A * | 5/1993 | Broberg | H05H 1/34 219/121.48 |
| 5,796,067 | A * | 8/1998 | Enyedy | B23K 10/00 219/121.51 |
| 6,194,682 | B1 | 2/2001 | Schneider et al. | |
| 6,207,923 | B1 * | 3/2001 | Lindsay | H05H 1/34 219/121.48 |
| 6,444,944 | B2 | 9/2002 | Schneider et al. | |
| 7,375,302 | B2 * | 5/2008 | Twarog | B23K 10/02 219/121.48 |
| 7,375,303 | B2 * | 5/2008 | Twarog | H05H 1/34 219/121.48 |
| 8,153,924 | B2 * | 4/2012 | Salsich | B23K 9/1006 219/121.36 |
| 8,395,074 | B2 * | 3/2013 | Winn | B23K 9/1006 219/121.39 |
| 8,395,076 | B2 | 3/2013 | Matus | |
| 2008/0023451 | A1 * | 1/2008 | Salsich | B23K 10/006 219/121.48 |
| 2009/0159577 | A1 * | 6/2009 | Sommerfeld | H05H 1/36 219/121.55 |
| 2014/0001167 | A1 | 1/2014 | Bunker et al. | |
| 2015/0174685 | A1 * | 6/2015 | Ward | B23K 9/1006 219/121.39 |
| 2015/0223314 | A1 * | 8/2015 | Hoermann | C09C 1/485 422/150 |
| 2015/0351214 | A1 * | 12/2015 | Patel | H05H 1/28 219/121.49 |

OTHER PUBLICATIONS

Invertec® PC208 & PC210, Operator's Manual, Feb. 2013, 10 pages.
Powermax190c®, Handheld Plasma System for Cutting Metal, Jun. 2008, 2 pages.
Powermax190c®, Plasma Arc Cutting System, Operator Manual 803650, Jan. 2004, 47 pages.
Invertec® PC208-PC210, Lincoln Electric Europe, Jan. 2009, 2 pages.
Invertec® PC-210, Jun. 2009, 2 pages.
Hobart AirForce 250ci and HP-25 Torch, Owner's Manual, Jan. 2010, 36 pages.
Photograph of Hobart AirForce 250ci in cutaway view with on-board compressor, Hobart AirForce 250ci was commercialized prior to May 30, 2014, 1 page.
Tomahawk® 375 Air, Dec. 2010, 4 pages.
Photograph of Tomahawk® 375 Air in cutaway view with on-board compressor, Tomahawk® 375 Air was commercialized prior to May 30, 2014, 1 page.
International Search Report for corresponding PCT Patent Application No. PCT/US15/33424 dated Nov. 4, 2015, 17 pages.

* cited by examiner

PLASMA CUTTING SYSTEM WITH EFFICIENT COMPONENTS

CROSS REFERENCE TO RELATED APPLICATION

This application claims the benefit of and priority to U.S. Provisional Patent Application No. 62/005,526, filed May 30, 2014, the entire contents of which is owned by the assignee of the instant application and incorporated herein by reference in its entirety.

FIELD OF THE INVENTION

The present invention generally relates to a plasma cutting system with efficient components, and more particularly, to a plasma cutting system including integrated components for a compressor, a power supply, and/or a plasma arc torch.

BACKGROUND

Plasma arc cutting torches are widely used in the cutting, gouging and marking of materials. A plasma arc torch generally includes an electrode, a nozzle having a central exit orifice mounted within a torch body, electrical connections, passages for cooling, and passages for arc control fluids (e.g., plasma gas). Optionally, a swirl ring is employed to control fluid flow patterns in the plasma chamber formed between the electrode and the nozzle. In some torches, a retaining cap can be used to maintain the nozzle and/or swirl ring in the plasma arc torch. In operation, a plasma arc torch produces a plasma arc, which is a constricted jet of mostly ionized gas with high temperature and that can have sufficient momentum to assist with removal of molten metal. A plasma cutting system can include at least one plasma arc torch, a power source for supplying power to the plasma arc torch, and a gas source for supplying a gas (e.g., air) to the plasma arc torch to support various torch operations. In some designs, a compressor is used to compress the gas from the gas source and deliver the compressed gas to the plasma arc torch.

A typical plasma arc torch uses a total of about 240 standard cubic feet per hour (scfh) of air or higher compressed to about 65 pounds per square inch (psi) or higher. This total amount of air is typically directed through various flow paths in the plasma arc torch, such as to the shield, the nozzle, the electrode, and/or to the plasma chamber. FIG. 1 shows the various paths of gas (e.g., air) distribution in a typical plasma arc torch 100, which includes an electrode 102, a plasma chamber 103, a nozzle 104, a swirl ring 106, and a retaining cap 108. The electrode 102 defines a distal end 114 configured to receive an emissive element 116 and a proximal end 115 opposite of the distal end 114. The plasma chamber 103 is defined, at least in part, by the distal end 114 of the electrode 102 and the nozzle 104, which is situated in a spaced relationship from the electrode 102. The nozzle 104 includes a nozzle exit orifice 130. The swirl ring 106 is in fluid communication with the plasma chamber 103 and has at least one radially offset or canted gas distribution hole 118. The retaining cap 108 is securely connected (e.g., threaded) to the nozzle 104. A shield (not shown) can be connected (e.g., threaded) to the retaining cap 108.

In operation, a gas is introduced into the torch 100 through a gas inlet 110 at a flow rate of about 240 scfh or higher, and a gas flow 112 travels toward the distal end 114 of the electrode 102 in a channel between an exterior surface of the swirl ring 106 and an interior surface of the retaining cap 108. As the gas flow 112 passes the gas distribution hole 118 of the swirl ring 106, the flow 112 is divided about equally, approximately 50% of which forms a shield flow 120 and the remaining 50% of which forms a swirl flow 122. The shield flow 120 travels at a flow rate of about 125 scfh or higher in a channel between an exterior surface of the nozzle 104 and an interior surface of the retaining cap 108 eventually exiting the torch 100. The shield flow 120 can cool the nozzle 104, provide stability to the plasma arc generated, and remove dross. The swirl flow 122 travels through the distribution hole 118 and continues toward the plasma chamber 103 in a channel between an exterior surface of the electrode 102 and an interior surface of the nozzle 104. As the swirl flow 122 reaches the plasma chamber 103, the swirl flow 122 divides, about 20% of which (i.e., 10% of the input gas flow 112) forms a plasma chamber flow 124 and the remaining 80% of which (i.e., 40% of the input gas flow 112) forms an electrode vent flow 126. The plasma chamber flow 124 constricts the plasma arc in the plasma chamber 103 and exits the plasma chamber 103 through the nozzle exit orifice 130 at a flow rate of about 19 scfh or higher. In contrast, the electrode vent flow 126 is adapted to travel in a reverse direction from the distal end 114 of the electrode 102 to its proximal end 115 at a flow rate of about 96 scfh or higher and exit the torch 100 through a venting port (not shown) at the proximal end 115 of the electrode 102. The electrode vent flow 126 is adapted to cool the electrode 102 as it traverses the longitudinal length of the electrode 102.

One significant shortcoming associated with a typical plasma arc torch design (e.g., torch 100 of FIG. 1) is that such a torch requires a gas flow rate of about 240 scfh or higher, which represents inefficient use of incoming gas. This also means that a typical plasma arc torch requires a significant amount of compressed gas flow to stabilize the plasma arc and cool various torch components. For example, gas flow rate requirements for a typical plasma arc torch generally start at 4 cubic feet per minute (cfm) and can be as high as 9 cfm.

In addition to shortcomings associated with the high flow rate of the compressed air required to operate a typical plasma arc torch, another shortcoming is the poor quality of the compressed air generated by the compressor of a plasma cutting system. In general, better cut performance is possible if the compressed air delivered to the torch is cool and dry. However, achieving this is a challenge in a plasma cutting system, especially a system with an "on-board" air compressor (i.e., an air compressor integrated in the same housing as the power supply) because such a compressor normally produces hot, humid air. To overcome this limitation, existing designs use one or more after-cooler coils to reduce the temperature of the compressed air, but these coils rely on weak-forced convection to operate, thus generating a low heat transfer coefficient (e.g., about 60 W/m^2-° C.) that produces ineffective cooling.

Furthermore, existing plasma cutting systems have yet to be efficiently adapted for easy, portable usage, especially when the cutting systems have an on-board air compressor. For example, one design requires the air compressor to be powered by fixed input alternating-current (AC) voltage (e.g., 110 VAC or 240 VAC), which limits user options and makes the system difficult to use in field applications. Another design requires a separate power source (other than the source used to power the torch) to power the air compressor, which increases system component cost and reduces portability.

Thus, it is desirable to provide a plasma arc cutting system that has power and gas considerations for operating a plasma arc torch effectively at lower gas flow rate while maintaining about the same gas pressure, thereby enabling lower gas consumption and more efficient gas usage. Additionally, it is desirable to supply a gas to the plasma arc torch that is cool and dry, thereby allowing better torch performance. Moreover, it is desirable to provide a portable plasma cutting system that achieves the desired gas qualities described above, where the portable system can effectively integrate the power supply with the air compressor without introducing inconvenient limitations, such as adding bulky and/or costly components or requiring fixed input voltages.

SUMMARY

The present invention provides systems and methods to achieve efficient use of air (e.g., lower gas flow rate while maintaining similar gas pressure) by preventing unnecessary gas leaks in a plasma arc torch. For example, the torch can include one or more strategically positioned sealing devices (e.g., o-rings) to eliminate gas leaks through its rear end, which can increase plasma chamber pressure by about 6 psi at nominal environmental conditions. This design also increases the robustness of the electrode-swirl ring interface to reduce physical damages and particle contamination, which in turn increases optimal performance pressure range for the plasma cutting system. Such an improvement allows the torch to perform over wider environmental conditions and improves compressor performance.

Additionally, the invention provides systems and methods for improving the quality of the compressed air generated by the compressor. In one exemplary implementation of an integrated compressor-power supply design, an after-cooler tube for transporting the compressor air to the torch is located in the same housing as the compressor and power supply electronics. The after-cooler tube can be positioned directly in the blast of a cooling fan typically used to cool power supply electronics, thereby producing a high heat transfer coefficient (h) of about 112 W/m^2-° C. This design choice allows a reduced package size and more effective cooling than can be otherwise achieved in the same size package.

Moreover, the invention provides an integrated compressor-power supply design that is portable and easy to use, especially conducive to field applications. In some embodiments, an auxiliary direct-current (DC)-to-DC converter is used to power the integrated air compressor, where the DC-DC converter can draw DC power from existing torch power supply and produce an appropriate amount of DC voltage to power the air compressor. One major benefit of this design is that it provides a highly portable plasma cutting system with universal input AC voltage while minimizing the design change needed for the existing torch power supply, thus reducing design alteration cost.

In one aspect, a plasma cutting system is provided. The system includes a power source configured to generate a plasma arc and a plasma arc torch connected to the power source for delivering the plasma arc to a workpiece. The plasma arc torch defines a multi-function fluid flow path for sustaining the plasma arc and cooling the plasma arc torch such that the plasma cutting system has a power-to-gas flow ratio of at least 2 kilowatts per cubic feet per minute (KW/cfm). The power-to-gas flow ratio comprises a ratio of power of the generated plasma arc to a total gas flow supplied to the plasma arc torch. In some embodiments, the plasma arc torch is a blowback torch.

In some embodiments, the plasma cutting system further comprises a compressor operably connected to the power source and configured to supply a plasma gas to the plasma arc torch at a rate of less than about 80 standard cubic feet per hour (scfh). A direct-current-to-direct-current (DC-DC) converter can be operably connected between an output of the power source and an input of the compressor. The compressor can be integrated with the power source.

In some embodiments, the plasma cutting system further comprises a circumferential seal formed between an electrode and a swirl ring of the plasma arc torch to prevent the plasma gas from traveling in a reverse flow direction toward a proximal end of the torch away from the workpiece. The circumferential seal can be dynamic. In some embodiments, the plasma arc torch is configured to substantial inhibit rearward venting of the plasma gas in the plasma arc torch.

In another aspect, a plasma cutting system is provided. The system includes a power supply and a compressor. The power supply is disposed within a housing and configured to deliver a current of greater than about 25 amperes to a torch head for generating a plasma arc. The torch head comprises a distal end for receiving an emissive element and a proximal end. The compressor is disposed within the housing and operably connected to the power supply and configured to supply a plasma gas to the torch head. The torch head is configured to direct a flow of the plasma gas through a flow path in the torch head at a rate of not more than about 80 standard cubic feet per hour (scfh). In addition, the torch head defines the flow path for providing a multi-function fluid flow of plasma gas toward the distal end, where the torch head is configured to at least substantially prevent a reverse flow of the plasma gas toward the proximal end.

In some embodiments, the system further includes a direct-current-to-direct-current (DC-DC) converter operably connected between an output of the power supply and an input of the compressor. The compressor can be integrated with the power supply, such as an internal component of the power supply. The power supply can include a boost converter that provides a constant input voltage to the DC-DC converter regardless of the input voltage to the power supply.

In some embodiments, the torch head comprises an electrode, a swirl ring, a nozzle, a retaining cap, and a first circumferential seal formed between the electrode and the swirl ring to dynamically engage an external surface of the electrode to an internal surface of the swirl ring. The first circumferential seal at least substantially prevents the reverse flow of the plasma gas toward the proximal end of the torch head away from the workpiece. In addition, the torch head can include a second circumferential seal formed between the swirl ring and the retaining cap to engage an external surface of the swirl ring to an internal surface of the retaining cap.

In some embodiments, the multi-function fluid flow comprises: i) an electrode cooling flow portion between an external surface of the electrode and an internal surface of the swirl ring to cool the electrode; ii) a retaining cap flow portion between an external surface of the swirl ring and an internal surface of the retaining cap; and iii) a plasma chamber flow portion between an external surface of the electrode and an internal surface of the nozzle and in fluid connection with a plasma chamber of the torch head to constrict the plasma arc. The flow rate of the plasma chamber flow portion of the multi-functional fluid flow can be about 20 scfh. In some embodiments, the multi-function fluid flow further comprises a vent flow portion from an internal surface of the nozzle to an external surface of the nozzle to stabilize the plasma arc and cool the nozzle.

In some embodiments, a power-to-gas flow ratio of the plasma cutting system, which comprises a ratio of plasma cutting power generated by the power supply to a total flow of the plasma gas supplied by the compressor to the torch head, is greater than about 2 kilowatts per cubic feet per minute (KW/cfm).

In some embodiments, the flow rate of the plasma gas supplied by the compressor to the torch head is about 65 scfh.

In yet another aspect, a plasma cutting system is provided. The system comprises a power generation means for generating a plasma arc and a delivery means for delivering the plasma arc to a workpiece. The delivery means defines a multi-function fluid flow path for sustaining the plasma arc and cooling the delivery means such that the plasma cutting system has a power-to-gas flow ratio of at least 2 kilowatts per cubic feet per minute (KW/cfm). The power-to-gas flow ratio comprises a ratio of power of the plasma arc to a total gas flow supplied to the delivery means.

In other examples, any of the aspects above can include one or more of the following features. In some embodiments, the plasma cutting system further comprises a thermal regulation system including a fan for generating a flow of cooled air, a heat sink located downstream from the fan, and an output tube. The heat sink is connected to a set of electronics in the power source/power supply. The output tube is connected to the compressor and disposed in the power source/power supply for conducting the plasma gas from the compressor to the plasma arc torch. Additionally, the output tube is located substantially between the fan and the heat sink such that the output tube is substantially exposed to the flow of cooled air from the fan.

In some embodiments, the plasma cutting system further includes a set of baffles configured to direct the flow of cooled air from the fan to the output tube. In some embodiments, the plasma cutting system further comprises a water separator connected to the output tube. In some embodiments, the fan is configured to cool both the heat sink and the plasma gas in the output tube. In some embodiments, the output tube comprises a coil. The coil diameter can be approximately the same as or less than an annular flow area of the fan such that the output tube is substantially immersed in the flow of cooled air. At least one of the diameter of the output tube or the length of the output tube can be dimensioned such that the heat transfer rate from the plasma gas within the output tube to the internal surface of the output tube is approximately the same as the heat transfer rate from the exterior surface of the output tube to the ambient air.

In some embodiments, the power source/power supply operates at a current of less than about 50 amperes. In some embodiments, the plasma cutting system weighs no more than about 30 pounds. In some embodiments, the plasma cutting system has a volume of about 1640 inch$^3$.

It should also be understood that various aspects and embodiments of the invention can be combined in various ways. Based on the teachings of this specification, a person of ordinary skill in the art can readily determine how to combine these various embodiments. For example, in some embodiments, any of the aspects above can include one or more of the above features. One embodiment of the invention can provide all of the above features and advantages.

BRIEF DESCRIPTION OF THE DRAWING

The advantages of the invention described above, together with further advantages, may be better understood by referring to the following description taken in conjunction with the accompanying drawings. The drawings are not necessarily to scale, emphasis instead generally being placed upon illustrating the principles of the invention.

DESCRIPTION

In some embodiments, power supplies described herein are designed and manufactured to operate efficiently at low operational cost while also being affordable to purchase and maintain. Additionally, power supplies described herein can maintain a desired operational temperature while reducing (e.g., minimizing) power supply size and promoting a simplified component layout. Additionally, power supplies described herein can operate in a wide variety of environments at reasonable operational temperatures while minimizing the exposure of internal components to moisture and other environmental contaminants.

In some embodiments, the systems and methods described herein provide a material processing power supply unit (e.g., a plasma arc torch power supply) that is light weight and requires reduced gas flow and/or cooling flow relative to other systems (e.g., other systems with comparable power outputs). The power supplies described herein can be a small, more compact design.

The advantageous capabilities described herein can be achieved using modifications to the torch cooling subsystem, the power supply cooling subsystem, each alone or in combination with one another. For example, as discussed below, a torch cooling subsystem can include a fewer number of torch consumables (i.e., consumables requiring less compressed air flow) to achieve a higher power to cooling gas flow ratios. Additionally or alternatively, power supply cooling subsystems can include various features, such as electronic circuitry configurations to power an air compressor using a wide range of (e.g., universal) power inputs. Additionally or alternatively, in some cases, compressed air delivered to the torch can be cooled within the power supply by arranging tubing carrying the compressed air within a path or (e.g., directly within an exhaust path of) a power supply cooling fan rather than requiring multiple fan devices.

In general, plasma cutting systems of the present invention can include any of the various features or components described herein, either alone or in combination with one another, to achieve one or more advantageous results described herein.

Reduced Gas Flow

In one aspect, the present invention provides plasma arc torches that route compressed gas in a more efficient manner to help limit gas flow losses and reduce the amount of compressed gas needed to operate the torches, such as using limited (e.g., no) vent flow and reduced (e.g., minimal) shield gas flow. Additionally, in some embodiments, most or all of the gas flow in a torch can be directed axially towards the torch tip to help reduce losses.

Figure 2:
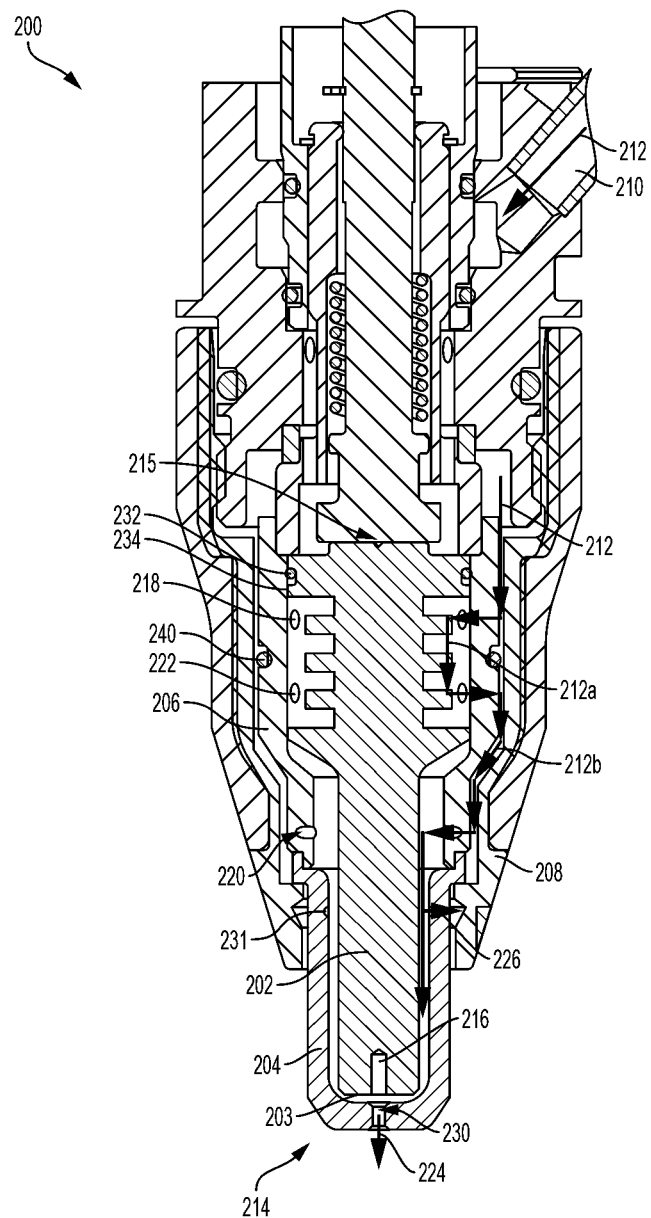
FIG. 2 shows an exemplary plasma arc torch that defines multi-function fluid flow paths therethrough.

FIG. 2 shows an exemplary plasma arc torch that defines multi-function fluid flow paths therethrough to achieve a reduced flow design. The plasma arc torch 200 of FIG. 2 can be a contact start, blowback torch configured to operate at 50 amps or less and/or greater than 25 amperes (e.g., 30 amps) at an input compressed gas flow rate of about less than about 80 scfh (e.g., 65 scfh). As shown, the plasma arc torch 200 includes an electrode 202, a plasma chamber 203, a nozzle 204, a swirl ring 206, and a retaining cap 208. The electrode 202 defines a distal end 214 configured to receive an emissive element 216 and a proximal end 215 opposite of the distal end. The plasma chamber 203 is defined, at least in part, by the distal end 214 of the electrode 202 and the nozzle 204, which is situated in a spaced relationship from the electrode 202. The nozzle 204 includes a nozzle exit orifice 230 and a nozzle vent hole 231. The swirl ring 206 is in fluid communication with the plasma chamber 203 and has three sets of one or more radially offset or canted gas distribution holes, including one set of one or more proximal holes 218 distributed radially around a proximal end (i.e., the end furthest away from the emissive element 216) of the swirl ring 206, another set of one or more distal holes 220 distributed radially around a distal end (i.e., opposite of the proximal end) of the swirl ring 206, and yet another set of middle holes 222 distributed radially around a middle section (i.e., between the proximal and distal ends) of the swirl ring 206. The retaining cap 208 is securely connected (e.g., threaded) to the nozzle 204. A circumferential seal 240 (e.g., an o-ring) can be inserted between the swirl ring 206 and the retaining cap 208 to engage an external surface of the swirl ring 206 to an internal surface of the retaining cap 208. A shield (not shown) can be connected (e.g., threaded) to the retaining cap 208.

Figure 3:
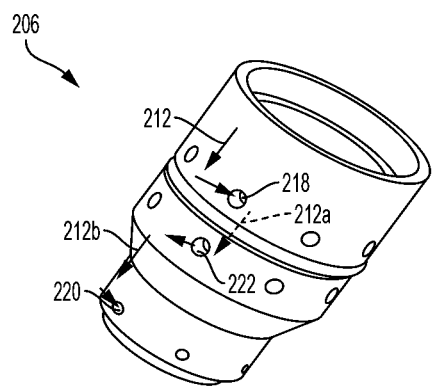
FIG. 3 shows a detailed view of gas flow through the swirl ring of FIG. 2.

In operation, as a gas is introduced into the torch 200 through a gas inlet 210 at a flow rate of less than 80 scfh (e.g., about 65 scfh), the gas flow 212 travels toward the distal end 214 of the electrode 202 in a channel between an exterior surface of the swirl ring 206 and an interior surface of the retaining cap 208. The gas flow 212 is then directed to the proximal end of the swirl ring 206 through the set of proximal holes 218 to cool the proximal region 215 of the electrode 202. This segment of the gas flow 212 is referred to as an electrode cooling flow 212a. As depicted, the electrode cooling flow 212a travels distally between an external surface of the electrode 202 and an inner surface of the swirl ring 206 to further cool the electrode 202. The electrode cooling flow 212a then exits the swirl ring 206 through the set of middle holes 222. The gas flow 212 continues to flow distally between an outer surface of the swirl ring 206 and an inner surface of the retaining cap 208. This segment of the gas flow 212 is referred to as a retaining cap flow 212b. The retaining cap flow 212b is then directed back into the swirl ring 206 through the third set of distal holes 220 to be used as a part of plasma swirl. FIG. 3 shows a detailed view of the gas flow 212 through the swirl ring 206 of FIG. 2, where the gas flow 212 enters the swirl ring 206 through the proximal holes 218, exits the swirl ring 206 through the middle holes 222, and enters the swirl ring 206 again through the proximal holes 220.

With reference to FIG. 2, the gas flow 212 continues to flow distally between the external surface of the electrode 202 and the internal surface of the nozzle 204 to cool both the electrode 202 and the nozzle 204. The gas flow 212 can then divide at the nozzle vent hole 231, about 30% of which forms a nozzle vent flow 226 and the remaining 70% forms a plasma chamber flow 224. The nozzle vent flow 226 can travel from an internal surface of the nozzle 204 to an external surface of the nozzle 204 at a rate of about 45 scfh to stabilize the plasma arc and cool the nozzle 204. The plasma chamber flow 224 can travel between an external surface of the electrode 202 and an internal surface of the nozzle 204 to reach the plasma chamber 203 and constrict the plasma arc therein. The plasma chamber flow 224 can exit the plasma chamber 203 through the nozzle exit orifice 230 at a flow rate of about 20 scfh.

Figure 1:
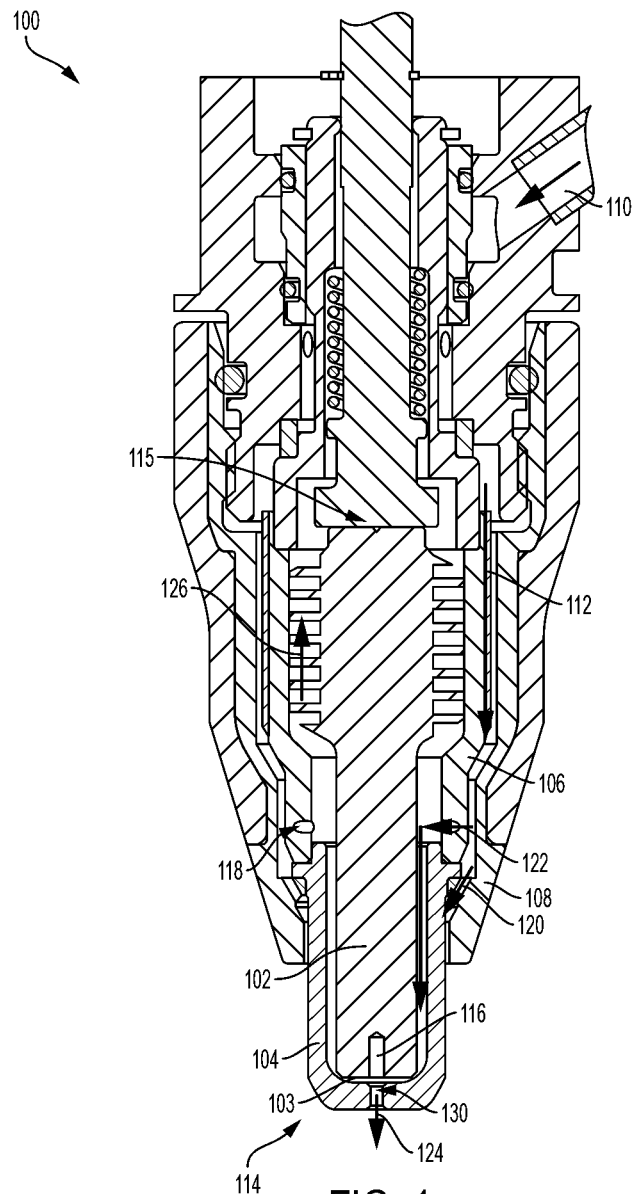
FIG. 1 shows a prior art plasma arc torch with various gas distribution flow paths therethrough.

In general, the torch design 200 of FIG. 2 creates a torch configuration in which gas flows substantially in the distal direction 214 toward the emissive element 216. In comparison to the prior art torch 100 of FIG. 1, the design of FIG. 2 uses significantly less amount of gas (e.g., compressed air) by creating multi-functional fluid flow paths throughout the torch 200. For example, the torch 200 of FIG. 2 reduces/eliminates the shield flow 120 of FIG. 1 and uses the nozzle vent flow 226 to stabilize plasma arc and cool the nozzle 204. Additionally, in FIG. 1, the internal electrode vent flow 126 of FIG. 1 is directed internally from the gas distribution holes 118 toward the proximal end 115. Instead, in the design of FIG. 2, the internal electrode cooling flow 212a is used to cool the electrode 202 via a path that is directed from the proximal region 215 toward the distal end 214. Reduction or elimination of the leaking gas flow (e.g., represented by the internal electrode vent flow 126 of FIG. 1) can lower gas consumption and improve performance including arc stability, cut speeds, and consumable cooling. In general, the multi-functional fluid flow paths in the torch 200 include, but not limited to: i) the electrode cooling flow 212a, ii) the retaining cap flow 212b, the plasma chamber flow 224 and/or the iv) the nozzle vent flow 226.

Figure 4:
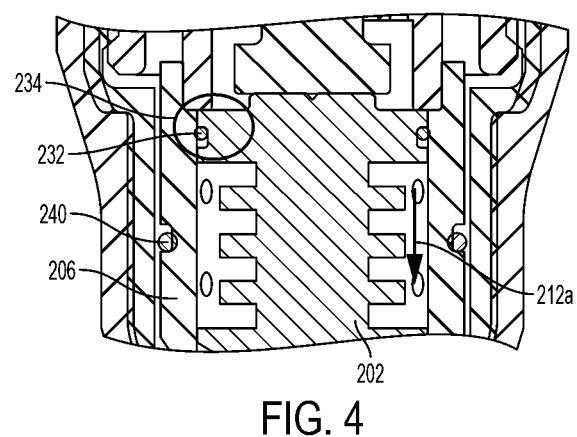
FIG. 4 shows a detailed view of the electrode-swirl ring interface of FIG. 2.

In some embodiments, the electrode 202 and/or the swirl ring 206 can include one or more sealing devices to further help reduce gas flow leakage within the torch and increase gas pressure within the plasma chamber 203. In particular, the sealing device can help reduce and/or eliminate backward (i.e., proximal) gas flow within the torch. As shown in FIG. 2, at least one circumferential sealing device 232, such as an o-ring, is disposed at the proximal end 215 of the electrode 202, at a circumferential interface 234 between an external surface of the electrode 202 and an internal surface of the swirl ring 206, to help limit gas from passing between the electrode 202 and the swirl ring 206 and flowing backward (i.e., proximally) within the torch 200. In some embodiments, at the interface 234, the sealing device 232 allows the external surface of the electrode 202 to move in the longitudinal direction in relation to the internal surface of the swirl ring 206 while providing a leak-proof seal between the two components. For example, the sealing device 232 can be dynamic and appropriately dimensioned such that it provides a certain amount of squeeze when the electrode 205 and the swirl ring 206 slide relatively to each other. In some embodiments, lubrication can be provided to the interface 234 to further prevent the electrode 205 and the swirl ring 206 from binding to each other. This dynamic freedom of movement is critical during pilot arc initiation (e.g., for a contact-start blowback torch), when sufficient pressure builds up in the plasma chamber 203 to push the electrode 202 away from the nozzle 204, at which point the electrode 202 needs to be able to move relative to the swirl ring 206 that is connected to the nozzle 204. FIG. 4 shows a more detailed view of the electrode-swirl ring interface 234 of FIG. 2, including the sealing device 232 positioned between the electrode 202 and the swirl ring 206.

Figure 5:
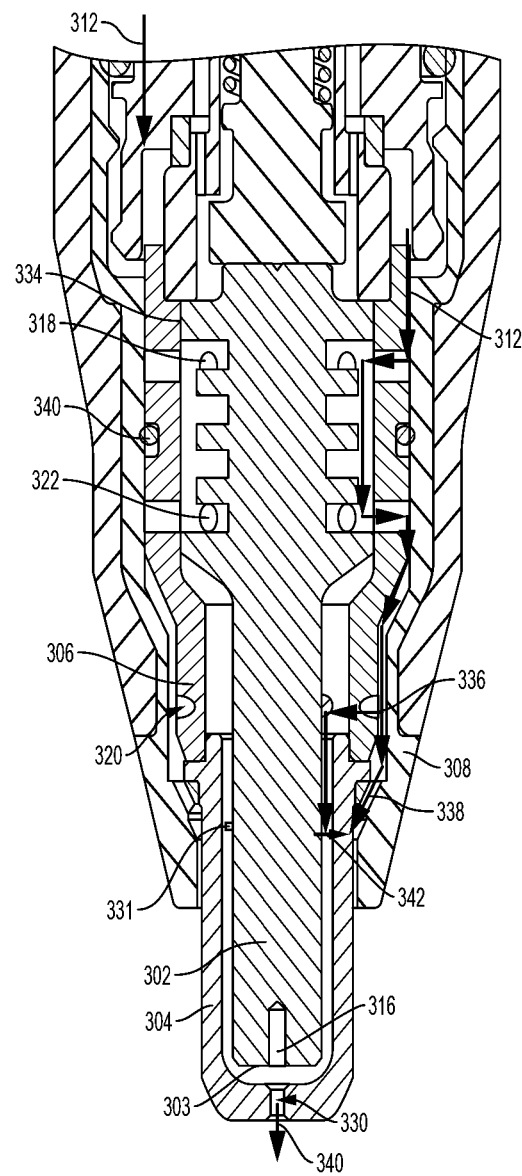
FIG. 5 shows another exemplary plasma arc torch that defines multi-function fluid flow paths therethrough.

FIG. 5 shows another exemplary plasma arc torch that defines multi-function fluid flow paths therethrough. The plasma arc torch 300 of FIG. 5 can be a contact start, blowback torch configured to operate at 50 amps or less and/or greater than 25 amperes (e.g., 30 amps) at an input compressed gas flow rate of about less than about 80 scfh (e.g., 77 scfh). As shown, the plasma arc torch 300 includes an electrode 302, a plasma chamber 303, a nozzle 304, a swirl ring 306, and a retaining cap 308. The electrode 302 defines a distal end 314 configured to receive an emissive element 316 and a proximal end 315 opposite of the distal end 314. The plasma chamber 303 is defined, at least in part, by the distal end 314 of the electrode 302 and the nozzle 304, which is situated in a spaced relationship from the electrode 302. The nozzle 304 includes a nozzle exit orifice 330 and a nozzle vent hole 331. The swirl ring 306 is in fluid communication with the plasma chamber 303 and has three sets of one or more radially offset or canted gas distribution holes, including one set of one or more proximal holes 318 distributed radially around a proximal end (i.e., the end furthest away from the emissive element 316) of the swirl ring 306, another set of one or more distal holes 320 distributed radially around a distal end (i.e., opposite of the proximal end) of the swirl ring 306, and yet another set of middle holes 322 distributed radially around a middle section (i.e., between the proximal and distal ends) of the swirl ring 306. The retaining cap 308 is securely connected (e.g., threaded) to the nozzle 304. A circumferential seal 340 can be formed between the swirl ring 306 and the retaining cap 308 to engage an external surface of the swirl ring 206 to an internal surface of the retaining cap 208. A shield (not shown) can be connected (e.g., threaded) to the retaining cap 308.

In operation, as a gas flow 312 is introduced into the torch 300 through a gas inlet (not shown) at a flow rate of less than 80 scfh (e.g., about 77 scfh), the gas flow 312 travels toward the distal end 314 of the electrode 302 (i.e., downward) in a channel between an exterior surface of the swirl ring 306 and an interior surface of the retaining cap 308. Similar to FIG. 2, the gas flow 312 (i) enters the swirl ring 306 through the proximal holes 318, (ii) flows downward between an exterior surface of electrode 302 and an interior surface of the swirl ring 306, and (iii) exits the swirl ring 306 through the middle holes 322. The gas flow 312 then flows downward between an exterior surface of the swirl ring 306 and an interior surface of the retaining cap 308 until reaching the proximal holes 320 of the swirl ring 306, at which point the gas flow 312 divides, a portion of which 336 enters the swirl ring 306 again through the proximal holes 320, while the remaining portion continues to flow downward between an external surface of the nozzle 304 and an interior surface of the retaining cap 308 to form a shield flow 338 that travels at a rate of about 31 scfh. The gas flow 336 divides at the nozzle vent hole 331, a portion of which flows toward the plasma chamber 303 to form a plasma chamber flow 340, while the remaining portion can travel from an internal surface of the nozzle 304 to an external surface of the nozzle 304 via the nozzle vent hole 331 at a rate of about 31 scfh to form the nozzle vent flow 342. The plasma chamber flow 340 can exit the plasma chamber 303 through the nozzle exit orifice 330 at a flow rate of about 15 scfh.

As shown, a sealing device is absent from the interface 334 between the electrode 302 and the swirl ring 306. Instead the interface 334 provides a surface seal (i.e., between the internal surface of the swirl ring 206 and the external surface of the electrode 202) to reduce gas leakage. However, in some cases, this configuration can still result in certain amount of backward leaking gas flow, such as about 7 to 8 scfh under nominal operating conditions. The extent of the leakage can vary with consumable dimensions. In addition, the extent of the leakage can increase if there is electrode sealing surface damage. For example, in the absence of a sealing device, the pressure in the plasma chamber 303 can be about 44 psi under nominal operating conditions. After multiple uses, this pressure can drop to about 24-27 psi at least in part due to wear between the electrode 302 and swirl ring 306 and/or contamination of the consumable components, which can create a gas passage at the interface 334. In general, variable amount of gas leakage puts large variations on the separation times between the electrode 302 and the nozzle 304 during pilot arc initiation, thereby making pilot arc initiation time unpredictable and sluggish in some cases, such as a delay of 750 ms between when the pilot arc initiation starts and when actual electrode-nozzle separation occurs.

In comparison, the sealing device 232 of FIG. 2 can reduce or eliminate backward leaking gas flow. The sealing device 232 can increase the pressure in the plasma chamber 203 by about 6 psi, such as from about 44 psi to about 50 psi, thus allowing cut process performance over a wider range of compressor output. In addition, using the sealing device 232 leads to no noticeable reduction in the plasma chamber pressure after multiple uses, indicating that the design can withstand physical wear and contamination. Furthermore, the sealing device 232 makes the separation time between the electrode 202 and the nozzle 204 during pilot arc initiation predictable and quicker by as high as 50% in comparison to the design of FIG. 5. For example, the torch design of FIG. 2 can achieve a delay of at most 400 ms between when the pilot arc initiation starts and when actual electrode-nozzle separation occurs. Some of the delay is due to the operation of the compressor system that supplies the gas flow to the torch 200, where the compressor system needs time to open the appropriate valves after being turned on and build up sufficient gas pressure for supply to the torch 200. Hence, using the sealing device 232 at the interface 234 allows consumable performance of the torch 200 to be more robust, less susceptible to variations in consumable dimensions and independent of physical damages to consumables (e.g., dent to the electrode 202 or contamination on the electrode 202 and/or the swirl ring 206). Moreover, the higher pressure achieved in the plasma chamber 203 of the torch design 200 in comparison to the design 300 due to the use of the sealing device 232 can cool the torch consumables more efficiently during use, thus enabling longer consumable life.

In general, the reduced-flow torch designs 200, 300 of FIGS. 2 and 5 use incoming gas flow more efficiently in comparison to the prior art torch design 100 of FIG. 1. As explained above, the reduced-flow designs 200, 300 can reduce and/or eliminate backward vent gas flow that is used to create a pressure differential to move torch components and add extra cooling to electrode and torch body (e.g., from about 96 scfh for torch 100 to about 0 scfh for torch 200 or to about 7 or 8 scfh for torch 300). Additionally, the reduced-flow designs 200, 300 allow reduced gas flow through the nozzle retaining cap to cool the nozzle or to clear kerf from a workpiece (e.g., reduced from 125 scfh in the shield flow 120 for torch 100 to about 0 scfh for torch 200 or to about 31 scfh in the shield flow 338 for torch 300). As a result, the total gas needed to operate the reduced gas flow torch design 200 of FIG. 2 can be about 65 scfh and the total gas needed to operate the reduced gas flow torch design 300 of FIG. 5 can be about 77 scfh, both of which are down from about 240 scfh in the torch design 100 illustrated in FIG. 1.

In view of the lower gas flow rate needed to operate the torch 200 of FIG. 2 or the torch 300 of FIG. 5, each torch can achieve a higher power (i.e., plasma arc torch operating power) to gas flow consumption ratio in comparison to most convention torch systems. Table 1 below illustrates estimated power-to-gas flow ratios corresponding to various conventional torch systems.

TABLE 1

| System | Rated Output | | | | Power/Flow |
| | Current (A) | Rated Output (V) | Output (kW) | Flow (cfm) | Ratio (kW/cfm) |
| --- | --- | --- | --- | --- | --- |
| Lincoln Tomahawk | 25 | 92 | 2.3 | 1.6 | 1.4 |
| TD Draggun | 35 | 92 | 3.2 | 2.7 | 1.2 |
| TD Aircut AC 15 | 15 | 92 | 1.4 | 1.0 | 1.4 |
| Hobart 250CI | 15 | 92 | 1.4 | 1.0 | 1.4 |
| PMX30XP | 30 | 125 | 3.8 | 4.0 | 0.9 |
| PMX45 | 45 | 132 | 5.9 | 4.5 | 1.3 |
| PMX65 | 65 | 139 | 9.0 | 6.7 | 1.4 |
| PMX85 | 85 | 143 | 12.2 | 6.7 | 1.8 |

Some conventional plasma arc systems, including the systems describe in Table 1, consume a significant amount of compressed gas flow to support both a cutting arc (e.g., typically a small percentage of the total compressed gas) and a cooling shield gas flow (e.g., typically a large percentage of the total compressed gas). Some conventional systems can require compressed gas flows to be provided at about 4 cubic feet per minute (cfm) to about 9 cfm. Such high gas requirements can be detrimental as some shop air compressors that have outputs in the 2-3 cfm range.

In contrast, the systems of the present invention, including the reduced-flow torch designs 200, 300 have high power-to-gas flow ratios of at least 2 kilowatts per cubic feet per minute (KW/cfm). The high power-to-gas flow ratios can indicate high efficiency systems. The high power-to-gas ratios are achieved in part due to the lower flow rate of the plasma gas supplied to the torches, such as 80 scfh or less to sustain a 50 amp or less operation. In some embodiments, the higher efficiency systems can be configured to operate at 30 amps with a rated output of 83 volts (e.g., resulting in 2.5 kilowatts (kW)) using a compressed gas flow of about 1 cfm. The resulting power-to-gas flow ratio is about 2.5 kW/cfm. In some embodiments, a minimum gas flow used to sustain a reasonable plasma arc in a 30-amp plasma cutter is as low as about 0.3 cfm. Such increased power-to-gas flow ratios can result in reduced startup costs for end users (e.g., with lower-end air compressor systems).

In some embodiments, due to the lower plasma gas flow requirement, each torch system can use a smaller air compressor to provide the plasma gas to the torch system. In some embodiments, the torch systems can include built-in, portable air compressors that provide lower amounts of compressed air flow of about 1 cfm to 2 cfm. Such integrated design can increase system portability and autonomy (e.g., enable the system to be powered by on-board gas source and/or battery power).

Compact Heat Exchangers

On most plasma arc cutting systems, better cutting performance can be made possible if the compressed air delivered to the torch (e.g., the torch 200 of FIG. 2 or torch 300 of FIG. 5) as process gas is cool and dry. On plasma arc cutting systems with an 'on-board' air compressor, where the air compressor is located in the same housing as the power supply, there is an extra challenge because hot, humid air is typically supplied by the compressor. In some existing devices, an after-cooler coil (i.e., a cooled coil for delivering compressed air from a compressor to a plasma arc torch) is provided to reduce the temperature of the compressed air generated by on-board compressor. However, these devices typically rely on very weak forced convection to operate, resulting in a low heat transfer coefficient (h) of about 60 W/m^2-° C.

In one aspect, a portable plasma arc cutting system is provided having a power supply and an air compressor integrated in a single enclosure, along with a thermal regulation system configured to regulate the temperature of the power electronics and the compressed air generated. The thermal regulation system includes an after-cooler coil that can be positioned in the enclosure between a fan typically used to cool power supply electronics (hereinafter referred to as "heat sinks") and the heat sinks such that the after-cooler coil is directly in the blast of the cooling fan. The resulting heat transfer coefficient can be about 112 W/m^2-° C. This arrangement significantly improves compressed air cooling with little additional costs to the system. Furthermore, by using the fan that cools power supply electronics to additionally cool the after-cooler coil, enhanced overall cooling capabilities can be achieved using only one fan, rather than using an additional fan dedicated to cooling only compressed air. As a result of the increased cooling, torch systems can be designed with fewer components, having a reduced package size and more effective cooling than can otherwise be achieved in the same sized package.

Figure 6A:
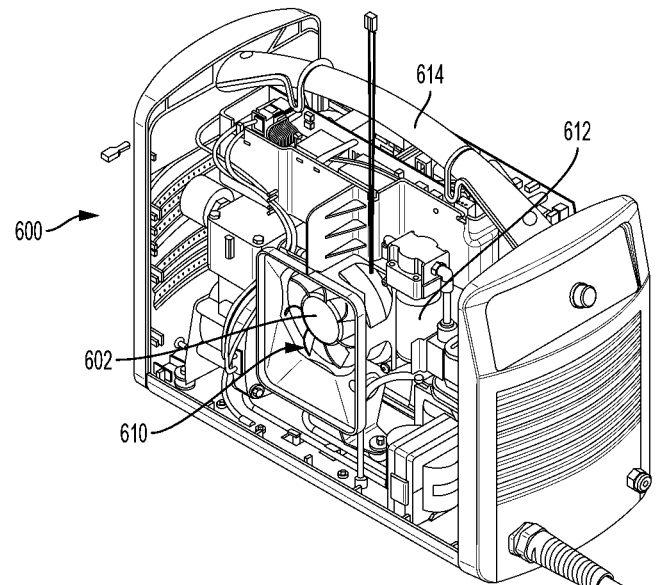
FIGS. 6A-C show various views of an exemplary enclosure with an on-board air compressor.
Figure 6B:
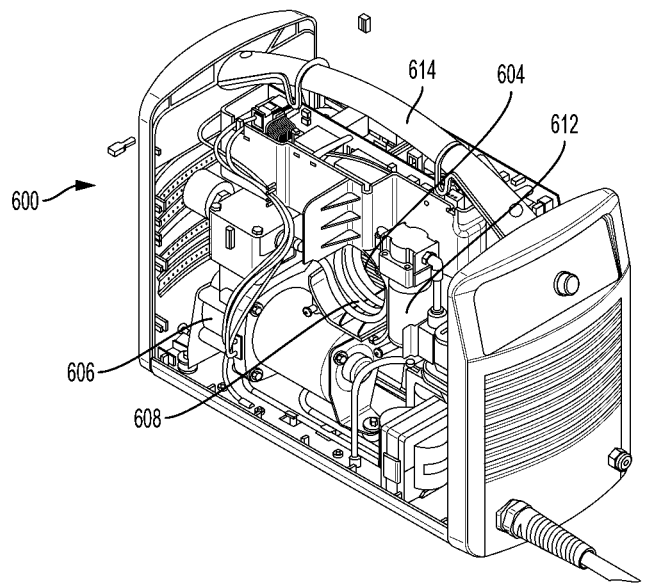
Figure 6C:
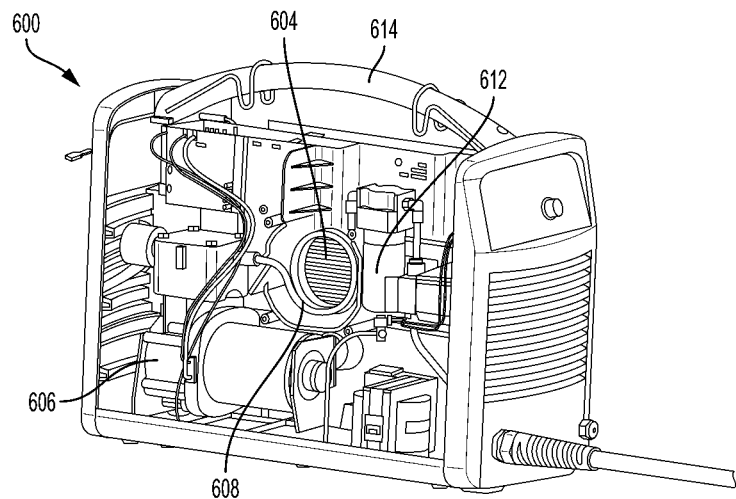

FIGS. 6A-C show various views of an exemplary enclosure that includes an on-board air compressor with power supply electronics. In some of the drawings of FIGS. 6A-C, certain components are removed to improve clarity of the illustrations. For example, a sheet metal cover for the enclosure 600 is omitted, but can be a part of the enclosure 600. As shown, the enclosure 600 can house at least one cooling fan 602, heat sinks 604, a compressor 606, and a compressor output tube 608. FIG. 6A show the enclosure 600 with the fan 602 installed therein and FIGS. 6B and 6C show the enclosure 600 with the fan 602 removed to better display the compressor output tube 608 disposed within the outlet of the fan 602. The enclosure 600 is configured such that an air flow 610 can enter the enclosure on one side and pass through to the other side, where the heat sinks 604 are located. The electronics of the power supply, represented by the heat sinks 604, can be cooled by the cooling fan 602.

The compressor output tube 608 serves as a conduit for delivering gas from the compressor 606 to a torch (not shown) coupled to the enclosure 600, where an inlet of the compressor output tube 608 is connected to the compressor 606 while an outlet of the compressor output tube 608 is connected to the torch. The compressor output tube 608 can be located between the cooling fan 602 and the heat sinks 604. As a result of the arrangement of the compressor output tube 608 within the cooling path of the fan 602, the cooling flow from the fan 602 cools both the heat sinks 604 and the compressed air in the compressor output tube 608. In some embodiments, after the cooling flow from the fan 602 passes over and cools the compressor output tube 608 followed by the heat sinks 604, the heat sinks 604 can redirect the air flow towards different electrical components within the enclosure 600.

In some embodiments, the compressor output tube 608 is located close to the fan 602 (e.g., as close to the fan 602 as possible) and directly in the high-speed output blast of the fan 602. As shown in FIGS. 6A-C, the compressor output tube 608 can be stored in the same compartment as the fan 602 and substantially surrounds the circumference of the fan 602. The compressor output tube 608 can comprise a copper tubing shaped into a coil or other convenient arrangement for purposes of cooling the compressed air flowing therein. In some embodiments, the coil outer diameter is approximately the diameter of the fan's annular flow area so that a substantial portion of the coil (e.g., the entire coil) can be immersed in a flow of high-velocity cooling air generated by the fan 602. In some embodiments, the enclosure 600 can include one or more features, such as vanes, baffles or ducts, to direct the flow of air from the fan 602 towards the compressor output tube 608 to deliver high-velocity cooling air to the exterior of the compressor output tube 608. Heat exchange can be further improved by using an extended surface (e.g., fins) on the exterior of the output tube 608 and/or a longer length tubing. These features are useful when the output tube 608 is located at a distance from the fan 602, which can provide lower velocity cooling air to the output tube 608.

The diameter and length of the compressor output tube 608 can also be adjusted (e.g., optimized) in view of the particular flow of compressed air and the particular speed of the fan blast. Optimal performance is typically achieved when the heat transfer from compressed air in the compressor output tube 608 to the internal surface of the compressor output tube 608 (e.g., a copper tube) occurs at approximately the same rate as the heat transfer from the external surface of the compressor output tube 608 to the ambient air. Consistent heat transfer rates can help to limit (e.g., prevent) excessive heat from building within the air or within the compressor output tube 608. This arrangement can also improve (e.g., maximize) cooling efficiency given a tube of fixed size, or conversely allow for a reduced (e.g., minimum) tube length given a fixed velocity of cooling air. As an example, if the compressor output tube 608 is a copper tube, the transfer of heat from the compressed air flow within the copper tube to the cooling flow outside of the copper tube can be analyzed as three steps:

1) Transfer from compressed air stream to copper tube wall controlled by $h_i$, (convection coefficient for internal transfer), with thermal resistance=$1/h_i$, [° C.-m²/W]
2) Conduction of heat through the wall of the copper tube controlled by $k_c$, (coefficient of thermal conduction for copper), with thermal resistance=$T/k_{Cu}$ [° C.-m²/W] where T is the thickness of the copper tube wall.
3) Transfer from the copper tube to the external stream of cooling air controlled by $h_e$, (convection coefficient for external transfer), with thermal resistance=$1/h_e$ [° C.-m²/W]

Thus, for a copper tube with a wall thickness of 0.032 inch that contains a compressed air flow of 1 SCFM at 55 PSIG and 120° C., the thermal resistance is about 2.08E-06 [° C.-m²/W] (for step 2). Thermal resistance for steps 1) and 3) depend on air velocities and tube diameters. For example, a ¼" dia copper tube carrying a compressed air flow of 1 SCFM at 55 PSIG and 120° C. corresponds to an internal thermal resistance of about 6.64E-03 [° C.-m²/W]. Smaller diameter tubes can decrease the internal thermal resistance due to a higher Reynolds number ($N_{Re}$), but at the cost of higher ΔP given a fixed flow rate.

Externally, the velocity of cooling air over the compressor output tube 608 depends on the location of the cooling fan 602. If there is no fan (e.g., 'natural' convection driven only by buoyancy), air velocities created can be about 0.15 m/s. Calculations show that this condition has a thermal resistance of at least 5.87E-02 [° C.-m²/W] at the exterior of a ¼" copper tube. Since forced convection generally decreases thermal resistance, a fan located at the far end of a small enclosure can create a 2 m/s flow of cooling air over the tube, which is like to result in an external thermal resistance of 1.67E-02 [° C.-m²/W]. Smaller diameter tubes generally increase thermal resistance since less surface area is available for heat transfer.

Comparing the three heat transfer steps, it can be concluded that conduction through the wall of the copper tube demonstrates the lowest heat transfer resistance of all the steps by about 3 orders of magnitude. The next lowest heat transfer resistance is attributed to internal convection, i.e., the transfer of heat from the compressed air to the copper tube. The dominant factor in limiting heat removal from the compressed air is the heat transfer from the copper tube to the external cooling flow, which provides the largest heat transfer resistance by about 1 order of magnitude. Furthermore, based on comparison of 'natural' convection to low-speed forced-convection, it can be concluded that higher cooling flow speeds enhances overall heat exchange without increasing the length of the copper tube used.

Thus, by locating a helically coiled compressor output tube 608 directly in the path of the annular exhaust of a tube-axial fan 602, as illustrated in FIGS. 6A-C, the output tube 608 can be exposed to the maximum airspeed within the enclosure 600. In some embodiments, the coiled compressor output tube 608 is oriented on the same centerline (e.g., concentrically) as the tube-axial fan 602. In some embodiments, a 92 mm square fan is used that has a flow of 72 CFM and produces a flow velocity of 6.82 meters per second (m/s). By locating the coiled compressor output tube 608 within the fan output flow, external thermal resistance can be 8.92E-03 [° C.-m²/W] if the output tube 608 is made of copper, which is about the same as the internal thermal resistance. Higher flow velocity does not typically increase overall heat exchange because internal thermal resistance can begin to dominate as long as tube diameter and compressed air flow remain fixed.

In some embodiments, the enclosure 600 includes at least one water-separator/air-filter device 612 configure to remove condensation and excess moisture present in the compressor output tube 608. Such moisture can be generated as a result of cooling of the compressed air by the air flow of the fan 602.

In general, the enclosure 600 includes 1) a compressor output tube 608 located within high-speed air, 2) where the output tube 608 is located between a cooling fan 602 and other heat-sinks 604 cooled by the fan 602, 3) with the fan 602 as near to the properly-sized output tube 608 as possible (e.g., the output tube 608 comprising a coil having a maximum diameter that fits within the same compartment for storing the fan 602), and/or 4) a filter-separator 612 in fluid communication with the output tube 608 to remove the condensed water from the compressed air flow.

The enclosure 600 is transportable and can be a handheld enclosure and/or a briefcase-sized enclosure. For example, the enclosure 600 can be hand-carried or otherwise transported to local and remote locations for use. A handle 614 can be attached to the enclosure 600 to facilitate transportation and/or enable an operator to carry the enclosure 600 during a plasma cutting operation. In some embodiments, the enclosure 600 is compact and autonomous, including (i) a power supply comprising a battery to provide torch operation without connection to an electric grid and (ii) a gas source comprising an onboard gas container or ambient air. In some embodiments, the enclosure 600 weighs no more than about 30 pounds, which include the power supply electronics (without a battery), the air compressor and the attached plasma arc torch. In some embodiments, the enclosure 600 has a volume of about 1640 inch$^3$.

Universal Input AC Voltage

As described above, a plasma cutting system having integrated built-in air compressor can be highly portable for various field applications. Previously, a fixed input AC voltage (e.g., 110 VAC or 240 VAC) is used to power the integrated system. Alternatively, the air compressor is powered by a separate power source other than the cutting system power supply. These previous systems have limitations. For example, an AC-powered compressor can limit the choice of power sources, add inconvenience to end users, and/or increase device production cost.

In one aspect, a plasma-cutting system power supply assembly is provided to supply energy to a plasma arc torch (e.g., the reduced-flow torch of FIG. 2 or 5) and an onboard air compressor (e.g., air compressor 606 of FIGS. 6A-C). In some embodiments, the power supply assembly can be installed in the housing 600 of FIGS. 6A-C to power both the plasma arc torch and the air compressor.

Figure 7:
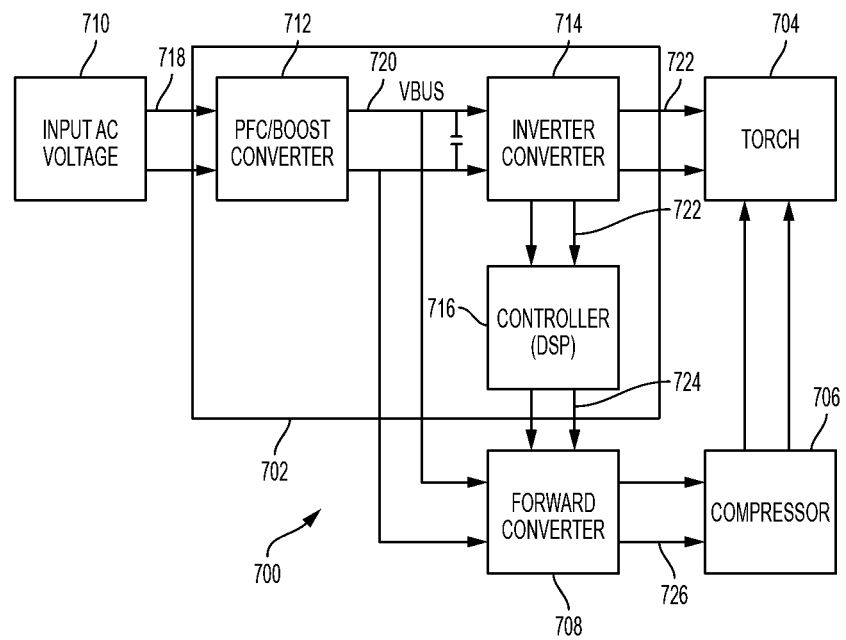
FIG. 7 shows an exemplary design of a plasma-cutting system power supply assembly.

FIG. 7 shows an exemplary design of a plasma-cutting system power supply assembly. As shown, the power supply assembly 700 includes a power supply circuit 702 for powering both a plasma arc torch 704 and an air compressor 706 via an auxiliary power converter 708. The power supply circuit 702 is connected to an input power source 710 that can provide an alternate-current (AC) input signal 718 to the power supply circuit 702, which can include a boost circuit 712, an inverter circuit 714, and a controller 716.

The boost circuit 712 can be in electrical communication with the input power source 710, the inverter circuit 714, and the auxiliary power converter 708. The boost circuit 712 can be a power factor corrected (PFC) boost converter that converts the input signal 718 from the input power source 710 to a constant, predefined direct-current (DC) output signal 720. While the voltage of the input signal 718 can vary based on the magnitude of the input power supply 710, the voltage of the output signal 720 can be maintained by the boost circuit 712 to be substantially constant at a desired power supply internal voltage ($V_{BUS}$) that is optimal for operating the plasma arc torch 704. For example, the input power source 710 can be a wall power that generates an AC input signal 718 ranging between 98 to 265 VAC, while the voltage of the output signal 720 can be maintained close to a $V_{BUS}$ of about 385 VDC. The boost circuit 712 can provide the constant voltage output signal 720 to both the inverter circuit 714 to power the plasma arc torch 704 and the auxiliary power converter 708 to power one or more auxiliary components, such as the compressor 706.

The inverter circuit 714 is in electrical communication with the boost circuit 712, the controller 716 and the plasma arc torch 704. The inverter circuit 714 can modify the output signal 720 from the boost circuit 712, such as convert the output signal 720 from a DC waveform to an AC waveform, prior to providing the resulting modified signal 722 to the plasma arc torch 704 to power an operation of the torch. The inverter circuit 714 can also provide the modified signal 722 to the controller 716.

The controller 716, which can be a digital signal processor based controller, is in electrical communication with the inverter circuit 714 and the auxiliary power converter 708. The controller 716 is configured to determine an appropriate control output 724 based on the modified signal 722 supplied by the inverter circuit 714 and use the control output 724 to control the function of the auxiliary power converter 708. The controller 716 can monitor system voltage, current, and temperature signals and use the monitored values in a feedback loop to control the voltage of the output signal 720 and/or the voltage/current supplied to the torch 704 via the modified signal 722.

In addition, to the plasma arc torch 704, the output signal 720 from the boost circuit 712 can provide energy to one or more power auxiliary components, such as a compressor 706 (e.g., built into the power supply). In some embodiments, the compressor 706 is a compact 15V DC motor. To power the compressor 706, the output signal 720 from the boost circuit 720 can be provided to the auxiliary power converter 708 (e.g., a forward converter), which can be an auxiliary direct-current (DC) to DC converter. In operation, the auxiliary power converter 708 can convert the power supply internal voltage $V_{BUS}$ (e.g., at 385V DC) in the output signal 720 to a compressor signal 726 with appropriate voltage to operate the compressor 706 (e.g., at 15V DC). The auxiliary power converter 708 can be controlled by the control output 724 from the controller 716 to coordinate the supply of power. For example, the controller 716 can determine and regulate the on/off state of the auxiliary power converter 708 based on system control sequence The power supply assembly 700 of FIG. 7 thus allows the DC power source from an existing cutter power supply (e.g., a $V_{BUS}$ output signal 720 from the boost circuit 712) that is used to power the plasma arc torch 704 to also power the compressor 706. Therefore, the power supply assembly 700 can handle voltage variations in the input power source 710 and maintain consistent voltage delivered to both the torch 704 and the compressor 706.

A substantial benefit of this design is that it creates a highly portable plasma cutting system with universal input AC voltage. Such a design also reduces (e.g., minimizes) the changes needed for use on existing cutting power supplies, which can reduce cost. Additionally, such a system can help to precisely control voltage delivered to the compressor 706 (e.g., to accommodate any of various compressors, modes, and/or conditions), essentially allowing the compressor 706 to operate independent of the AC line and giving an operator precise control of compressor operation.

Other related concepts can also help to provide consistent (e.g., universal) input voltage(s) for the compressor system. In some embodiments, the compressor 706 is a customized high voltage DC compressor that is directly powered by $V_{BUS}$ of the output signal 720 (i.e., without the auxiliary power converter 708). In some embodiments, an auxiliary housekeeping power module (e.g., a flyback converter, etc.) of the power supply circuit 702 is modified to power the compressor 706. In some embodiments, separate power converters (e.g., a buck converter, etc.) with large input AC voltage range can be used to power the compressor 706.

While several aspects have been described herein to help create a more compact and efficient power supply, it is noted that specific embodiments need not incorporate all of the features or aspects described herein. That is, embodiments can include any of various combinations of one or more of the aspects, components, or features described herein.

While various embodiments have been described herein, it should be understood that they have been presented and described by way of example only. Thus, the breadth and scope of an embodiment should not be limited by any of the above-described exemplary structures or embodiments.

What is claimed is:

1. A plasma cutting system comprising:
   an enclosure including:
      a power source located in the enclosure and configured to generate a plasma arc; and
      a compressor located in the enclosure and operably connected to the power source for generating a gas supply to the plasma cutting system;
   a plasma arc cutting torch connected to the power source for delivering the plasma arc to cut a workpiece at a distal end of the torch, the torch comprising a swirl ring, an electrode, a nozzle, and a plasma chamber defined by the electrode and the nozzle; and
   a circumferential seal formed between the electrode and the swirl ring of the torch, the circumferential seal configured to prevent the gas supply from traveling in a reverse flow direction toward a proximal end of the torch away from the workpiece,
   wherein the plasma arc cutting torch further comprises a second circumferential seal formed between the swirl ring and a retaining cap to engage an external surface of the swirl ring to an internal surface of the retaining cap,
   wherein the plasma arc cutting torch defines a multi-function fluid flow path that receives the gas supply from the compressor for sustaining the plasma arc and cooling the plasma arc cutting torch, the multi-function fluid flow path channeling the gas supply in a substantially forward direction through a proximal swirl ring inlet to an electrode cooling passage located between an external surface of the electrode and an inner surface of the swirl ring, the multi-function fluid flow path exiting the electrode cooling passage by a distal swirl ring outlet to flow toward the distal end of the torch, such that the plasma cutting system has a power-to-gas flow ratio of at least 2 kilowatts per cubic feet per minute (KW/cfm) of the gas supply that is supplied from the compressor to the plasma arc cutting torch.

2. The plasma cutting system of claim 1, wherein the compressor is configured to provide the gas supply to the plasma arc torch at a rate of less than about 80 standard cubic feet per hour (scfh).

3. The plasma cutting system of claim 1, wherein the plasma arc torch is a blowback torch.

4. The plasma cutting system of claim 1, wherein the circumferential seal is dynamic such that the circumferential seal allows the electrode and the swirl ring to slide relative to each other.

5. The plasma cutting system of claim 1, further comprising a direct-current-to-direct-current (DC-DC) converter operably connected between an output of the power source and an input of the compressor, wherein the compressor is integrated with the power source.

6. The plasma cutting system of claim 1, further comprising a thermal regulation system including:
   a fan for generating a flow of cooled air;
   a heat sink located downstream from the fan, the heat sink connected to a set of electronics in the power source; and
   an output tube connected to the compressor and disposed in the power source for conducting the plasma gas from the compressor to the plasma arc torch, the output tube located substantially between the fan and the heat sink such that the output tube is substantially exposed to the flow of cooled air from the fan.

7. The plasma cutting system of claim 6, further comprising a set of baffles configured to direct the flow of cooled air from the fan to the output tube.

8. The plasma cutting system of claim 6, wherein the output tube comprises a coil, the diameter of the coil being approximately the same as or less than the annular flow area of the fan such that the coil is substantially immersed in the flow of cooled air.

9. The plasma cutting system of claim 1, wherein the power source operates at a current of less than about 50 amperes.

10. The plasma cutting system of claim 1, wherein the plasma cutting system weighs no more than about 30 pounds.

11. The plasma cutting system of claim 1, wherein the plasma cutting system has a volume of about 1640 inch$^3$.

12. The plasma cutting system of claim 1, wherein the plasma arc torch is configured to substantial inhibit rearward venting of the plasma gas in the plasma arc torch.

13. The plasma cutting system of claim 1, wherein the power source is configured to deliver a current of greater than about 25 amperes to the plasma arc cutting torch.

14. The plasma cutting system of claim 5, wherein the power source comprises a boost converter that provides a constant input voltage to the DC-DC converter regardless of the input voltage to the power supply.

15. The plasma cutting system of claim 1, wherein the multi-function fluid flow path channels the gas supply, after exiting from the electrode cooling passage, through a channel between an external surface of the swirl ring and an internal surface of a retaining cap.

16. The plasma cutting system of claim 15, wherein the multi-function fluid flow path divides into a first exit channel that directs a first portion of the gas supply to exit the torch via the plasma chamber and a second exit channel that directs a remainder portion of the gas supply to exit the torch via a vent passages extending from an internal surface of the nozzle to an external surface of the nozzle to stabilize the plasma arc and cool the nozzle.

17. The plasma cutting system of claim 6, wherein at least one of the diameter or the length of the output tube is dimensioned such that the heat transfer rate from the plasma gas within the output tube to an internal surface of the output tube is approximately the same as the heat transfer rate from an exterior surface of the output tube to ambient air.

18. The plasma cutting system of claim 6, further comprising a water separator connected to the output tube.

19. The plasma cutting system of claim 6, wherein the fan is configured to cool both the heat sink and the plasma gas in the output tube.

20. The plasma cutting system of claim 1, wherein the compressor is an internal component of the power supply.

21. The plasma cutting system of claim 1, wherein the flow rate of the gas supply provided by the compressor to the plasma arc cutting torch is about 65 scfh.

22. The plasma cutting system of claim 16, wherein the flow rate of the gas supply through the plasma chamber is about 20 scfh.

* * * * *